United States Patent
Kim et al.

(10) Patent No.: US 11,960,321 B2
(45) Date of Patent: Apr. 16, 2024

(54) FOLDABLE ELECTRONIC DEVICE COMPRISING INTEGRATED-ADHESIVE LAYER AND ADHESION PREVENTION PART

(71) Applicant: Samsung Electronics Co., Ltd., Gyeonggi-do (KR)

(72) Inventors: Seonghoon Kim, Gyeonggi-do (KR); Jonghae Kim, Gyeonggi-do (KR); Sungho Ahn, Gyeonggi-do (KR); Kwangtai Kim, Gyeonggi-do (KR); Donghyun Yeom, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 353 days.

(21) Appl. No.: 17/275,548

(22) PCT Filed: Sep. 11, 2019

(86) PCT No.: PCT/KR2019/011799
§ 371 (c)(1),
(2) Date: Mar. 11, 2021

(87) PCT Pub. No.: WO2020/060104
PCT Pub. Date: Mar. 26, 2020

(65) Prior Publication Data
US 2022/0107666 A1 Apr. 7, 2022

(30) Foreign Application Priority Data
Sep. 19, 2018 (KR) .................. 10-2018-0112343

(51) Int. Cl.
*G06F 1/16* (2006.01)
*H04M 1/02* (2006.01)

(52) U.S. Cl.
CPC ........ *G06F 1/1616* (2013.01); *H04M 1/0216* (2013.01); *H04M 1/0268* (2013.01)

(58) Field of Classification Search
CPC ............................ G06F 1/1681; G06F 1/1616
See application file for complete search history.

(56) References Cited

U.S. PATENT DOCUMENTS

| 9,910,458 B2 | 3/2018 | Watanabe et al. |
| 9,911,793 B2 | 3/2018 | Lee et al. |

(Continued)

FOREIGN PATENT DOCUMENTS

| KR | 1020150078001 | 7/2015 |
| KR | 1020160063964 | 6/2016 |

(Continued)

OTHER PUBLICATIONS

PCT/ISA/210 Search Report issued on PCT/KR2019/011799, dated Jan. 3, 2020, pp. 5.

(Continued)

*Primary Examiner* — Abhishek M Rathod
(74) *Attorney, Agent, or Firm* — The Farrell Law Firm, P.C.

(57) ABSTRACT

Disclosed is an electronic device comprising: a display, a buffer layer disposed on one surface of the display, an adhesive layer disposed on one surface of the buffer layer, and an adhesion prevention part disposed on a portion of one surface of the adhesive layer, the part corresponding to a folding area where the foldable electronic device is folded, wherein the adhesion prevention part is formed by printing an ink material and curing the ink material by an ultraviolet ray. In addition, various embodiments understood through the specification are possible.

14 Claims, 9 Drawing Sheets

(56) References Cited

U.S. PATENT DOCUMENTS

| | | | |
|---|---|---|---|
| 9,935,278 B2 | 4/2018 | Kim et al. | |
| 10,276,810 B2 | 4/2019 | Kim et al. | |
| 10,382,600 B2 | 8/2019 | Lin et al. | |
| 10,429,893 B2 | 10/2019 | Kim et al. | |
| 2015/0185782 A1* | 7/2015 | Kim | G06F 1/1652 |
| | | | 156/212 |
| 2017/0084673 A1* | 3/2017 | Lee | H10K 50/84 |
| 2017/0153668 A1* | 6/2017 | Jang | G06F 1/1643 |
| 2017/0329436 A1* | 11/2017 | Choi | G06F 3/0446 |
| 2018/0107250 A1* | 4/2018 | Cho | G06F 1/1652 |
| 2018/0235084 A1 | 8/2018 | Aurongzeb et al. | |
| 2018/0295735 A1* | 10/2018 | Ahn | H05K 5/0226 |
| 2018/0343756 A1* | 11/2018 | Lin | B32B 7/14 |
| 2019/0305238 A1* | 10/2019 | Shin | H10K 59/40 |
| 2019/0334114 A1* | 10/2019 | Park | H10K 77/111 |
| 2019/0346887 A1* | 11/2019 | Park | G06F 1/1681 |
| 2019/0357366 A1* | 11/2019 | Choi | H04M 1/0268 |
| 2020/0019212 A1* | 1/2020 | Jung | G06F 1/1641 |
| 2020/0259242 A1 | 8/2020 | Aurongzeb et al. | |

FOREIGN PATENT DOCUMENTS

| | | |
|---|---|---|
| KR | 1020160110674 | 9/2016 |
| KR | 1020170036190 | 4/2017 |
| KR | 1020170063344 | 6/2017 |
| KR | 1020180036323 | 4/2018 |
| KR | 1020180081119 | 7/2018 |

OTHER PUBLICATIONS

PCT/ISA/237 Written Opinion issued on PCT/KR2019/011799, dated Jan. 3, 2020, pp. 5.
Korean Office Action dated Feb. 22, 2023 issued in counterpart application No. 10-2018-0112343, 8 pages.
European Search Report dated Feb. 1, 2023 issued in counterpart application No. 19863676.3-1224, 6 pages.

* cited by examiner

FOLDABLE ELECTRONIC DEVICE COMPRISING INTEGRATED-ADHESIVE LAYER AND ADHESION PREVENTION PART

PRIORITY

This application is a National Phase Entry of PCT International Application No. PCT/KR2019/011799 which was filed on Sep. 11, 2019, and claims priority to Korean Patent Application No. 10-2018-0112343, which was filed on Sep. 19, 2018, the entire contents of each of which is incorporated herein by reference.

TECHNICAL FIELD

Embodiments of the disclosure described herein relate to a technology for preventing foreign matter introduced into a folding area where a foldable electronic device is folded from adhering to an adhesive layer, by placing the adhesive layer of the foldable electronic device on the folding area as well and placing an adhesion prevention part.

BACKGROUND ART

A foldable electronic device is an electronic device in which a module layer including a display is able to be folded in a specific area. The foldable electronic device has a folding area that is a foldable area.

The foldable electronic device may include a buffer layer disposed on one surface of the module layer. Furthermore, an adhesive layer for coupling the module layer and the buffer layer with a bracket or a plate may be disposed on at least part of one surface of the buffer layer.

DISCLOSURE

Technical Problem

The adhesive layer of the foldable electronic device is disposed on areas other than the folding area. When the adhesive layer is not disposed on the folding area, a step corresponding to the thickness of the adhesive layer may be formed on the folding area, and therefore a flexure portion may be visible to a user.

To prevent the formation of the step, a step compensation layer may be disposed on one surface of the plate disposed on the folding area. When the step compensation layer is disposed, repeated folding of the foldable electronic device may cause damage such as wrinkles on the folding area.

Furthermore, to prevent the formation of the step, the adhesive layer may be disposed on the folding area as well. When the adhesive layer is disposed on the folding area as well, foreign matter such as dust that is introduced into the folding area may adhere to the adhesive layer.

Embodiments of the disclosure are aimed at providing an electronic device for solving the problems mentioned above and problems posed in the disclosure.

Technical Solution

A foldable electronic device according to an embodiment of the disclosure includes a display, a buffer layer disposed on one surface of the display, an adhesive layer disposed on one surface of the buffer layer, and an adhesion prevention part disposed on a portion of one surface of the adhesive layer that corresponds to a folding area where the foldable electronic device is folded, the adhesion prevention part being formed by printing an ink material and thereafter curing the ink material with UV light.

A foldable electronic device according to an embodiment of the disclosure includes a display, a buffer layer disposed on one surface of the display, an adhesive layer disposed on one surface of the buffer layer, and an adhesion prevention part disposed on a portion of one surface of the adhesive layer that corresponds to a folding area where the foldable electronic device is folded, the adhesion prevention part being formed by applying a coating material or attaching a film.

A foldable electronic device according to an embodiment of the disclosure includes a display, a buffer layer disposed on one surface of the display, an adhesive layer disposed on one surface of the buffer layer, and an adhesion prevention part that has a specified thickness and that is disposed on a portion of one surface of the adhesive layer that corresponds to a folding area where the foldable electronic device is folded. The adhesive layer has, on the folding area, a smaller thickness reduced by the specified thickness than on an area other than the folding area.

Advantageous Effects

According to the embodiments of the disclosure, a step formed on the folding area may be reduced.

Furthermore, according to the embodiments of the disclosure, damage such as wrinkles on the folding area may be prevented even when the foldable electronic device is repeatedly folded.

Moreover, according to the embodiments of the disclosure, foreign matter such as dust that is introduced into the folding area may be prevented from adhering to the adhesive layer.

In addition, the disclosure may provide various effects that are directly or indirectly recognized.

DESCRIPTION OF DRAWINGS

With regard to description of the drawings, identical or similar reference numerals may be used to refer to identical or similar components.

MODE FOR INVENTION

Hereinafter, various embodiments of the disclosure will be described with reference to accompanying drawings. However, this is not intended to limit the disclosure to specific embodiments, and it should be understood that the disclosure includes various modifications, equivalents, and/or alternatives of the embodiments of the disclosure.

Figure 1:
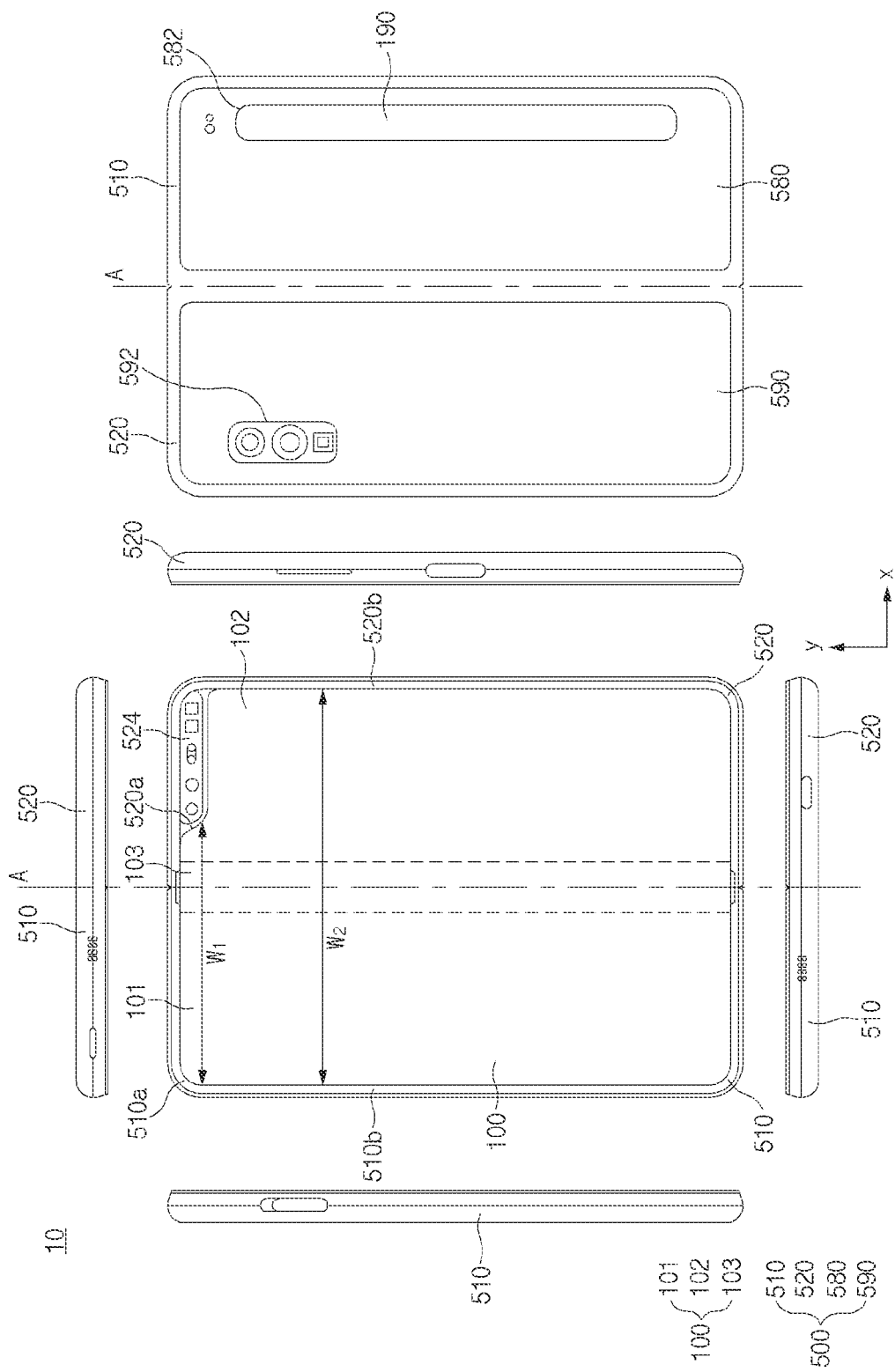
FIG. 1 is a view illustrating a flat state of an electronic device according to an embodiment.
Figure 2:
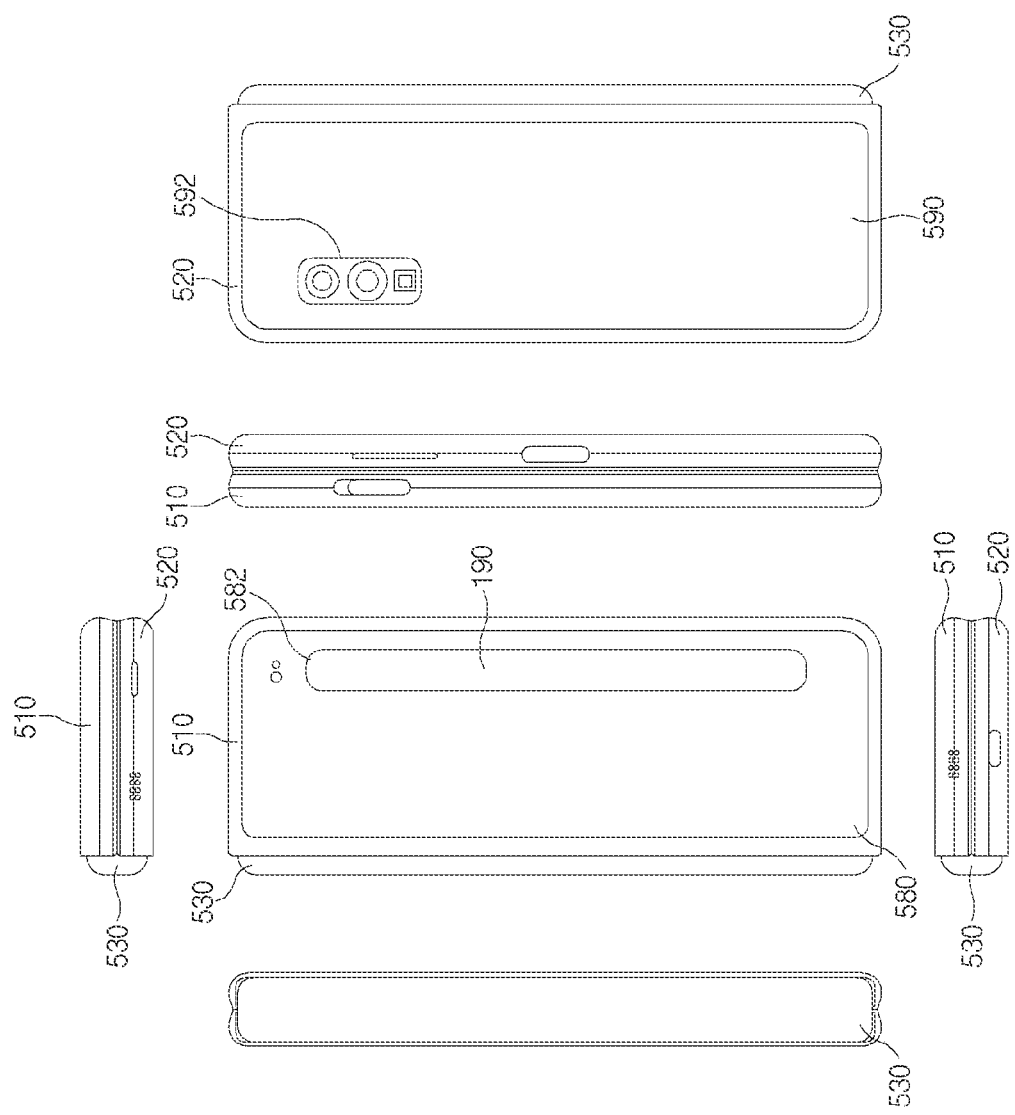
FIG. 2 is a view illustrating a folded state of the electronic device according to an embodiment.

Referring to FIGS. 1 and 2, in an embodiment, an electronic device 10 may include a foldable housing 500, a hinge cover 530 that covers a foldable portion of the foldable housing, and a flexible or foldable display 100 (hereinafter, abbreviated to the "display" 100) that is disposed in a space formed by the foldable housing 500. In this disclosure, a surface on which the display 100 is disposed is defined as a first surface or a front surface of the electronic device 10. An opposite surface to the front surface is defined as a second surface or a rear surface of the electronic device 10. Surfaces surrounding a space between the front surface and the rear surface are defined as third surfaces or side surfaces of the electronic device 10.

In an embodiment, the foldable housing 500 may include a first housing structure 510, a second housing structure 520 including a sensor area 524, a first back cover 580, and a second back cover 590. The foldable housing 500 of the electronic device 10 is not limited to the form and coupling illustrated in FIGS. 1 and 2 and may be implemented by a combination and/or coupling of other shapes or components. For example, in another embodiment, the first housing structure 510 and the first back cover 580 may be integrally formed with each other, and the second housing structure 520 and the second back cover 590 may be integrally formed with each other.

In the illustrated embodiment, the first housing structure 510 and the second housing structure 520 may be disposed on opposite sides of a folding axis (an axis A) and may have shapes that are entirely symmetric to each other with respect to the folding axis A. As will be described below, the angle or distance between the first housing structure 510 and the second housing structure 520 may vary depending on whether the electronic device 10 is a flat state, a folded state, or an intermediate state. In the illustrated embodiment, unlike the first housing structure 510, the second housing structure 520 may additionally include the sensor area 524 in which various sensors are disposed. However, the first housing structure 510 and the second housing structure 520 may have mutually symmetrical shapes in the other areas.

In an embodiment, as illustrated in FIG. 1, the first housing structure 510 and the second housing structure 520 may form a recess in which the display 100 is accommodated. In the illustrated embodiment, due to the sensor area 524, the recess may have two or more different widths in a direction perpendicular to the folding axis A.

For example, the recess may have (1) a first width w1 between a first portion 510a of the first housing structure 510 that is parallel to the folding axis A and a first portion 520a of the second housing structure 520 that is formed on an edge of the sensor area 524 and (2) a second width w2 between a second portion 510b of the first housing structure 510 and a second portion 520b of the second housing structure 520 that does not correspond to the sensor area 524 and that is parallel to the folding axis A. In this case, the second width w2 may be greater than the first width w1. In other words, the first portion 510a of the first housing structure 510 and the first portion 520a of the second housing structure 520 that have mutually asymmetrical shapes may form the first width w1 of the recess, and the second portion 510b of the first housing structure 510 and the second portion 520b of the second housing structure 520 that have mutually symmetrical shapes may form the second width w2 of the recess. In an embodiment, the first portion 520a and the second portion 520b of the second housing structure 520 may have different distances from the folding axis A. The width of the recess is not limited to the illustrated example. In various embodiments, the recess may have a plurality of widths depending on the form of the sensor area 524 or the asymmetrical portions of the first housing structure 510 and the second housing structure 520.

In an embodiment, at least part of the first housing structure 510 and at least part of the second housing structure 520 may be formed of a metallic material or a non-metallic material that has a stiffness selected to support the display 100.

In an embodiment, the sensor area 524 may have a predetermined area formed adjacent to one corner of the second housing structure 520. However, the arrangement, shape, and size of the sensor area 524 are not limited to the illustrated example. For example, in another embodiment, the sensor area 524 may be provided in another corner of the second housing structure 520 or in any area between an upper corner and a lower corner of the second housing structure 520. In an embodiment, components embedded in the electronic device 10 to perform various functions may be exposed on the front surface of the electronic device 10 through the sensor area 524 or through one or more openings formed in the sensor area 524. In various embodiments, the components may include various types of sensors. The sensors may include, for example, at least one of a front camera, a receiver, or a proximity sensor.

The first back cover 580 may be disposed on one side of the folding axis on the rear surface of the electronic device. For example, the first back cover 580 may have a substantially rectangular periphery, and the periphery may be surrounded by the first housing structure 510. Similarly, the second back cover 590 may be disposed on an opposite side of the folding axis on the rear surface of the electronic device and may have a periphery surrounded by the second housing structure 520.

In the illustrated embodiment, the first back cover 580 and the second back cover 590 may have substantially symmetrical shapes with respect to the folding axis (the axis A). However, the first back cover 580 and the second back cover 590 do not necessarily have to have mutually symmetrical shapes. In another embodiment, the electronic device may include the first back cover 580 and the second back cover 590 in various shapes. In another embodiment, the first back cover 580 may be integrally formed with the first housing structure 510, and the second back cover 590 may be integrally formed with the second housing structure 520.

In an embodiment, the first back cover 580, the second back cover 590, the first housing structure 510, and the second housing structure 520 may form a space in which various components (e.g., a printed circuit board or a battery) of the electronic device 10 are disposed. In an embodiment, one or more components may be disposed, or visually exposed, on the rear surface of the electronic device 10. For example, at least part of a sub-display 190 may be visually exposed through a first rear area 582 of the first back cover 580. In another embodiment, one or more components or sensors may be visually exposed through a second rear area 592 of the second back cover 590. In various embodiments, the sensors may include a proximity sensor and/or a rear camera.

Referring to FIG. 2, the hinge cover 530 may be disposed between the first housing structure 510 and the second housing structure 520 and may be configured to hide an internal component (e.g., a hinge structure). In an embodiment, the hinge cover 530 may be hidden by a portion of the first housing structure 510 and a portion of the second housing structure 520, or may be exposed to the outside, depending on a state (a flat state or a folded state) of the electronic device 10.

For example, when the electronic device 10 is in a flat state as illustrated in FIG. 1, the hinge cover 530 may not be exposed by being hidden by the first housing structure 510 and the second housing structure 520. In another example, when the electronic device 10 is in a folded state (e.g., a fully folded state) as illustrated in FIG. 2, the hinge cover 530 may be exposed to the outside from between the first housing structure 510 and the second housing structure 520. In another example, when the electronic device 10 is in an intermediate state in which the first housing structure 510 and the second housing structure 520 are folded with a certain angle, a portion of the hinge cover 530 may be exposed to the outside from between the first housing structure 510 and the second housing structure 520. However, in this case, the exposed area may be smaller than that when the electronic device 10 is in the fully folded state. In an embodiment, the hinge cover 530 may include a curved surface.

The display 100 may be disposed in the space formed by the foldable housing 500. For example, the display 100 may be mounted in the recess formed by the foldable housing 500 and may form most of the front surface of the electronic device 10.

Accordingly, the front surface of the electronic device 10 may include the display 100, and a partial area of the first housing structure 510 and a partial area of the second housing structure 520 that are adjacent to the display 100. The rear surface of the electronic device 10 may include the first back cover 580, a partial area of the first housing structure 510 that is adjacent to the first back cover 580, the second back cover 590, and a partial area of the second housing structure 520 that is adjacent to the second back cover 590.

The display 100 may refer to a display, at least a partial area of which is able to be deformed to be flat or curved. In an embodiment, the display 100 may include a folding area 103, a first area 101 disposed on one side of the folding area 103 (on a left side of the folding area 103 illustrated in FIG. 1), and a second area 102 disposed on an opposite side of the folding area 103 (on a right side of the folding area 113 illustrated in FIG. 1).

The division of the display 100 into the areas illustrated in FIG. 1 is illustrative, and the display 100 may be divided into a plurality of areas (e.g., four or more areas, or two areas) depending on the structure or function of the display 100. For example, in the embodiment illustrated in FIG. 1, the areas of the display 100 may be divided from each other by the folding area 103 extending parallel to the y axis or by the folding axis (the axis A). However, in another embodiment, the display 100 may be divided into areas with respect to another folding area (e.g., a folding area parallel to the x axis) or another folding axis (e.g., a folding axis parallel to the x axis).

The first area 101 and the second area 102 may have shapes that are entirely symmetric to each other with respect to the folding area 103. However, unlike the first area 101, the second area 102 may include a notch that is cut depending on the presence of the sensor area 524, and in the other area, the second area 102 may have a shape that is symmetric to the shape of the first area 101. In other words, the first area 101 and the second area 102 may include portions having mutually symmetrical shapes and portions having mutually asymmetrical shapes.

Hereinafter, operations of the first housing structure 510 and the second housing structure 520 and the areas of the display 100 depending on a state (e.g., a flat state or a folded state) of the electronic device 10 will be described.

In an embodiment, when the electronic device 10 is in a flat state (e.g., FIG. 1), the first housing structure 510 and the second housing structure 520 may be arranged to face the same direction while forming an angle of 180 degrees therebetween. A surface of the first area 101 and a surface o the second area 102 of the display 100 may face the same direction (e.g., the direction toward the front surface of the electronic device) while forming an angle of 180 degrees. The folding area 103, together with the first area 101 and the second area 102, may form the same plane.

In an embodiment, when the electronic device 10 is in a folded state (e.g., FIG. 2), the first housing structure 510 and the second housing structure 520 may be arranged to face each other. The surface of the first area 101 and the surface of the second area 102 of the display 100 may face each other while forming a narrow angle (e.g., an angle between 0 degrees and 10 degrees). At least part of the folding area 103 may be formed to be a curved surface having a predetermined curvature.

In an embodiment, when the electronic device 10 is in an intermediate state, the first housing structure 510 and the second housing structure 520 may be arranged to form a certain angle therebetween. The surface of the first area 101 and the surface of the second area 102 of the display 100 may form an angle that is greater than that in the folded state and is smaller than that in the flat state. At least part of the folding area 103 may be formed to be a curved surface having a predetermined curvature, and the curvature may be smaller than that in the folded state.

Figure 3:
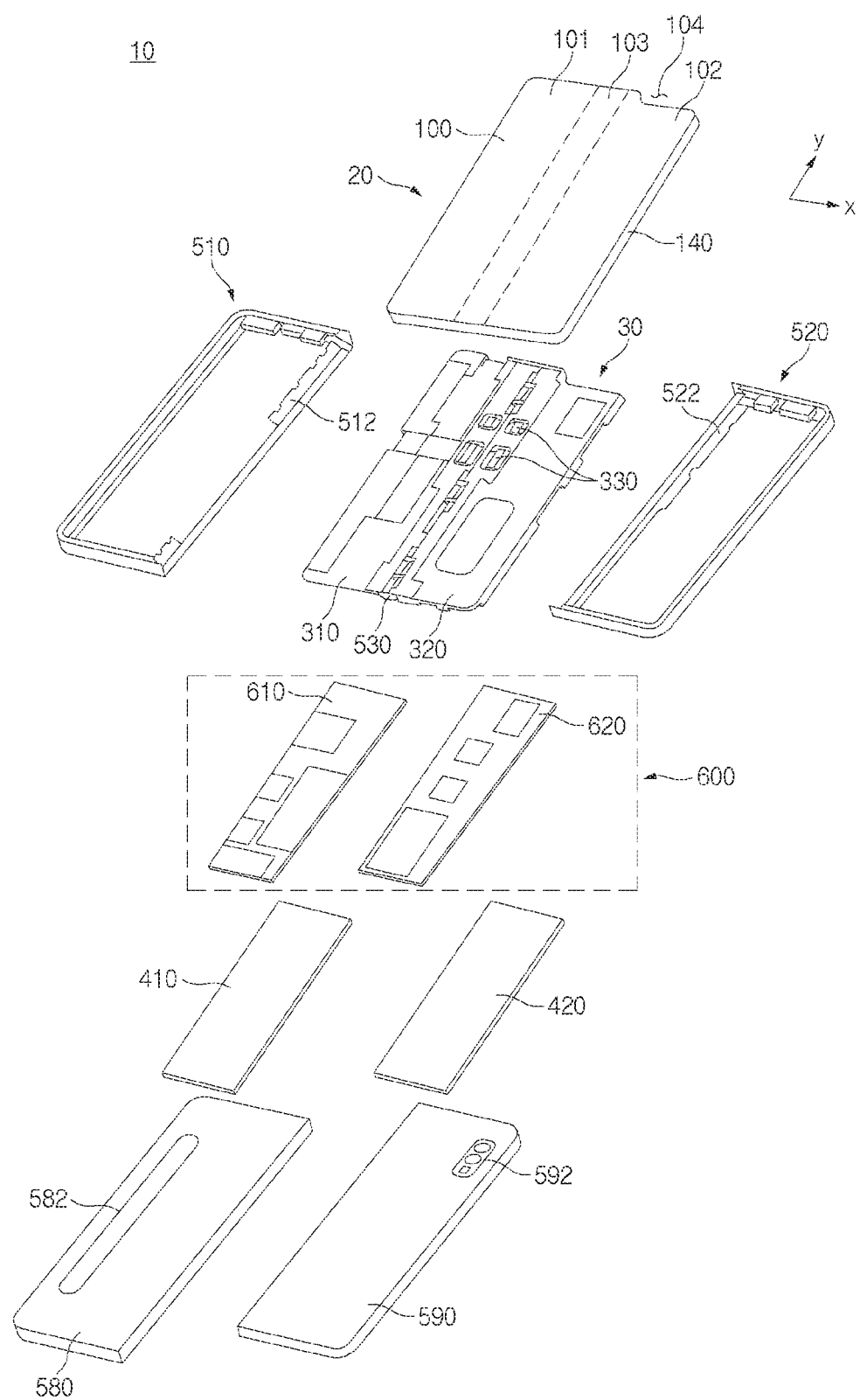
FIG. 3 is an exploded perspective view of the electronic device according to an embodiment.

FIG. 3 is an exploded perspective view of the electronic device according to an embodiment.

Referring to FIG. 3, in an embodiment, the electronic device 10 may include a display unit 20, a bracket assembly 30, a PCB 600, the first housing structure 510, the second housing structure 520, the first back cover 580, and the second back cover 590. In this disclosure, the display unit 20 may be referred to as the display module or the display assembly.

The display unit 20 may include the display 100 and one or more plates or layers 140 on which the display 100 is mounted. In an embodiment, the plates 140 may be disposed between the display 100 and the bracket assembly 30. The display 100 may be disposed on at least part of one surface (e.g., an upper surface with respect to FIG. 3) of the plates 140. The plates 140 may be formed in a shape corresponding to the display 100. For example, partial areas of the plates 140 may be formed in a shape corresponding to a notch 104 of the display 100.

The bracket assembly 30 may include a first bracket 410, a second bracket 420, a hinge structure disposed between the first bracket 410 and the second bracket 420, the hinge cover 530 that covers the hinge structure when viewed from the outside, and wiring members 430 (e.g., flexible printed circuits (FPCs)) across the first bracket 410 and the second bracket 420.

In an embodiment, the bracket assembly 30 may be disposed between the plates 140 and the PCB 600. For example, the first bracket 410 may be disposed between the first area 101 of the display 100 and a first PCB 610. The second bracket 420 may be disposed between the second area 102 of the display 100 and a second PCB 620.

In an embodiment, the wiring members 430 and at least part of the hinge structure may be disposed inside the bracket assembly 30. The wiring members 430 may be disposed in a direction (e.g., the x-axis direction) across the first bracket 410 and the second bracket 420. The wiring members 430 may be disposed in a direction (e.g., the x-axis direction) that is perpendicular to a folding axis (e.g., the y-axis or the folding axis A of FIG. 1) of the folding area 103 of the electronic device 10.

The PCB 600, as mentioned above, may include the first PCB 610 disposed on one side of the first bracket 410 and the second PCB 620 disposed on one side of the second bracket 420. The first PCB 610 and the second PCB 620 may be disposed in a space formed by the bracket assembly 30, the first housing structure 510, the second housing structure 520, the first back cover 580, and the second back cover 590. Components for implementing various functions of the electronic device 10 may be mounted on the first PCB 610 and the second PCB 620.

In a state in which the display unit 20 is coupled to the bracket assembly 30, the first housing structure 510 and the second housing structure 520 may be assembled together so as to be coupled to opposite sides of the bracket assembly 30. As will be described below, the first housing structure 510 and the second housing structure 520 may be coupled to the bracket assembly 30 by sliding on the opposite sides of the bracket assembly 30.

In an embodiment, the first housing structure 510 may include a first rotation support surface 512, and the second housing structure 520 may include a second rotation support surface 522 corresponding to the first rotation support surface 512. The first rotation support surface 512 and the second rotation support surface 522 may include a curved surface corresponding to the curved surface included in the hinge cover 530.

In an embodiment, when the electronic device 10 is in a flat state (e.g., the electronic device 10 of FIG. 1), the first rotation support surface 512 and the second rotation support surface 522 may cover the hinge cover 530 such that the hinge cover 530 is not exposed, or is minimally exposed, on the rear surface of the electronic device 10. Meanwhile, when the electronic device 10 is in a folded state (e.g., the electronic device of FIG. 2), the first rotation support surface 512 and the second rotation support surface 522 may rotate along the curved surfaces included in the hinge cover 530, such that the hinge cover 530 is exposed on the rear surface of the electronic device 10 to the maximum.

Figure 4:
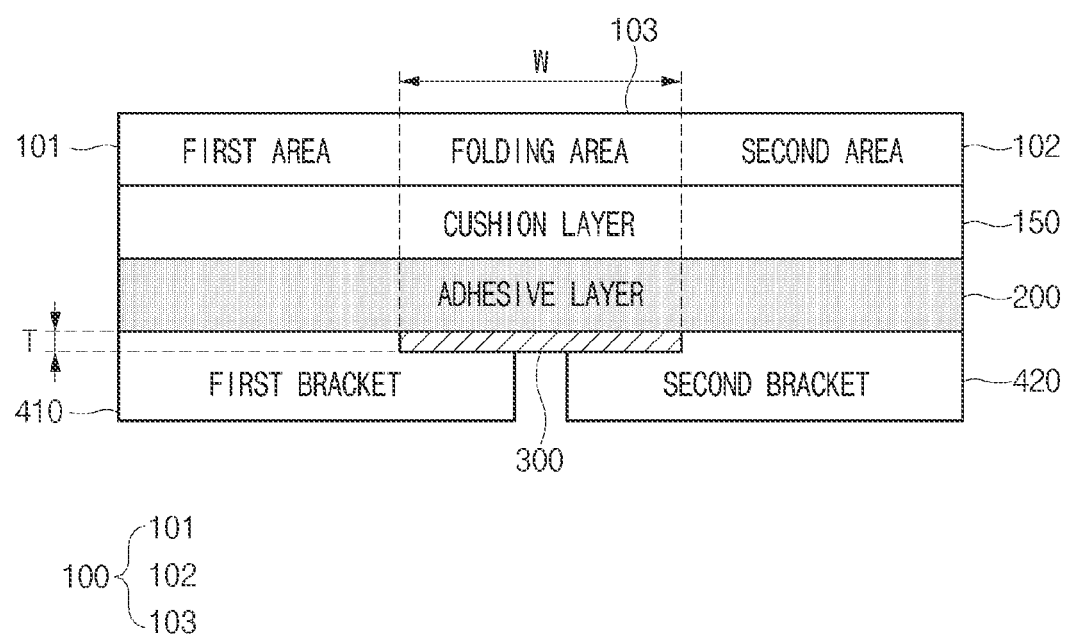
FIG. 4 is a side view illustrating a display, a buffer layer, an adhesive layer, an adhesion prevention part, a first bracket, and a second bracket in a flat state of a foldable electronic device according to an embodiment.

FIG. 4 is a side view illustrating a display 100, a buffer layer 150, an adhesive layer 200, an adhesion prevention part 300, a first bracket 410, and a second bracket 420 in a flat state of a foldable electronic device according to an embodiment.

In an embodiment, the display 100 may be disposed to be exposed on a front surface of the foldable electronic device. The display 100 may display an execution screen of an application activated in the foldable electronic device. The display 100 may include a display panel for displaying the execution screen and a display module for driving the display panel. The display module may include a display driver IC that receives and processes image data for displaying the execution screen and supplies voltage to pixels of the display panel, based on the image data. The display 100 may include a first area 101, a second area 102, and a folding area 103.

In an embodiment, the first area 101 and the second area 102 may define at least partial areas of the display 100. Each of the first area 101 and the second area 102 may be an area on one side of the display 100. For example, the first area 101 may be an area adjacent to one edge of the display 100, and the second area 102 may be an area adjacent to an opposite edge of the display 102.

In an embodiment, the folding area 103 may be disposed between the first area 101 and the second area 102. The first area 101 and the second area 102 may be spaced apart from each other in a first direction toward the opposite edges of the display 100. For example, the first area 101 and the second area 102 may be spaced apart from each other by the width W of the folding area 103 in the first direction.

In an embodiment, the folding area 103 may be an area where the foldable electronic device is folded. The folding area 103 may be formed of a flexible, elastic, or stretchable material. A ductile circuit or element may be disposed in the folding area 103.

In an embodiment, the buffer layer 150 may be disposed on one surface of the display 100. In an embodiment, the buffer layer 150 may be disposed on a rear surface of the display 100. The buffer layer 150 may be formed of a flexible, elastic, or stretchable material. For example, the buffer layer 150 may be formed of a foam or buffer material. The buffer layer 150 may have a thickness of 100 μm to 200 μm. For example, the buffer layer 150 may have a thickness of 150 μm.

In an embodiment, the shape or thickness of a portion of the buffer layer 150 that corresponds to the folding area 103 may be varied when the foldable electronic device is folded. For example, when the foldable electronic device is folded, a front surface of the buffer layer 150 that is adjacent to the display 100 may be contracted, and a rear surface of the buffer layer 150 that faces toward the first bracket 410 and the second bracket 420 may be expanded. The buffer layer 150 may prevent wrinkles on the folding area 103 that are caused by a repeated change in the shape of the folding area 103. Furthermore, the shape or thickness of the buffer layer 150 may be varied in response to a physical impact from the outside. The buffer layer 150 may prevent damage by absorbing an impact applied to the foldable electronic device.

In an embodiment, the adhesive layer 200 may be disposed on one surface of the buffer layer 150. For example, the adhesive layer 200 may be disposed on the rear surface of the buffer layer 150. The adhesive layer 200 may couple the buffer layer 150 with the first bracket 410 and the second bracket 420. The adhesive layer 200 may be formed of a pressure sensitive adhesive (PSA). The pressure sensitive adhesive may be made of an elastomer that acts an adhesive force when pressure is applied thereto. However, without being limited thereto, the adhesive layer 200 may be formed of a liquid optically clear adhesive (LOCA) that fixes the display 100 to the first bracket 410 and the second bracket 420. The adhesive layer 200 may have a thickness of 20 μm to 30 μm. For example, the adhesive layer 200 may have a thickness of 25 μm.

In an embodiment, the adhesive layer 200 may be integrally disposed on the rear surface of the buffer layer 150. The adhesive layer 200 may have a uniform thickness over the entire rear surface of the buffer layer 150. So as to be applied to the foldable electronic device, the adhesive layer 200 may have flexibility, elasticity, or stretch that satisfies a specified condition. Accordingly, the adhesive layer 200 may be disposed irrespective of whether to correspond to any area of the first area 101, the second area 102, or the folding area 103 of the display 100.

In an embodiment, when the adhesive layer 200 is integrally disposed, it is possible to solve the problem in which a flexure portion is visible due to a step on the folding area 103 when the adhesive layer 200 is not disposed on the folding area 103. Furthermore, when the adhesive layer 200 is integrally disposed, it is possible to solve the problem in which folding and unfolding of the foldable electronic device cause wrinkles on the folding area 103 when a step compensation part is disposed on the folding area 103. In addition, when the adhesive layer 200 is integrally disposed, a process of forming the adhesive layer 200 may be efficiently performed.

In an embodiment, the adhesion prevention part 300 may be disposed on at least part of one surface of the adhesive layer 200. For example, the adhesion prevention part 300 may be disposed on a portion of a rear surface of the adhesive layer 200 that corresponds to the folding area 103 of the display 100. The adhesion prevention part 300 may cover the adhesive layer 200 disposed in a portion corresponding to the folding area 103. The adhesion prevention part 300 may prevent foreign matter introduced into the folding area 103 from adhering to the portion of the adhesive layer 200 that corresponds to the folding area 103. Furthermore, the adhesion prevention part 300 may prevent the portion of the adhesive layer 200 that corresponds to the folding area 103 from adhering to the first bracket 410 or the second bracket 420.

In an embodiment, the adhesion prevention part 300 may be formed by printing an ink material and thereafter curing the ink material with ultraviolet (UV) light. The ink material may be a fluid with fluidity, or a material with a specified viscosity, which is able to be printed on the portion of the rear surface of the adhesive layer 200 that corresponds to the folding area 103. The ink material may include a material that reacts to UV light. For example, the ink material may include a photo-initiator that starts a coagulation reaction when receiving UV light. Accordingly, the ink material, when exposed to UV light, may be coagulated in a state of being applied to the portion corresponding to the folding area 103.

In an embodiment, the adhesive force or reactivity of the ink material with foreign matter introduced into the folding area 103 may be lower than or equal to a specified level. For example, the ink material may have a property of pushing the foreign matter introduced into the folding area 103 to prevent the foreign matter from being mixed with, or attached to, the ink material. The foreign matter such as dust or moisture that is introduced into the folding area 103 may be a polar substance, or a substance having a predetermined electric charge in a process of being introduced into the folding area 103. The ink material may be a non-polar material having a repulsive force against the foreign matter. In this case, the foreign matter introduced into the folding area 103 may fall from the adhesion prevention part 300. Furthermore, the adhesive force or reactivity of the ink material with the first bracket 410 or the second bracket 420 may be lower than or equal to a specified level. For example, the ink material may be a non-metallic material that does not adhere or react to metal of which the first bracket 410 or the second bracket 420 is formed.

In an embodiment, the ink material may include a unit material that constitutes a polymer compound. The ink material may include a monomer or oligomer that constitutes an organic polymer compound such as a carbon polymer compound. For example, when the adhesion prevention part 300 contains an acrylic compound, the ink material may include an acrylic monomer or an acrylic oligomer. Furthermore, the ink material may further include a material for polymerizing the unit material. For example, the ink material may further include an additive such as a catalyst that activates a polymerization process and increases the rate of the polymerization process.

In an embodiment, the adhesion prevention part 300 may have a gradually increasing thickness T from the periphery of the folding area 103 toward a central region of the folding area 103 with respect to the first direction. Flexure caused by a step on the folding area 103 that corresponds to the thickness T of the adhesion prevention part 300 may be visible at the boundary between the first area 101 and the folding area 103 or at the boundary between the second area 102 and the folding area 103. When the thickness T of the adhesion prevention part 300 is set to be thin at the periphery of the folding area 103 and is gradually increased toward the center of the folding area 103, the phenomenon in which the flexure is visible at the boundary between the first area 101 and the folding area 103 or at the boundary between the second area 102 and the folding area 103 may be decreased. In particular, when the adhesion prevention part 300 is formed by printing the ink material, the adhesion prevention part 300 may be easily formed in a shape in which the thickness T gradually increases from the periphery of the folding area 103 toward the center thereof.

In an embodiment, the adhesion prevention part 300 may be formed by applying a coating material or attaching a film. The coating material or the film may be applied or attached to the portion of the rear surface of the adhesive layer 200 that corresponds to the folding area 103. To stably position the coating material or the film, which forms the adhesion prevention part 300, on the folding area 103, the coating material or the film may have an adhesive force with the adhesive of which the adhesive layer 200 is formed.

In an embodiment, the adhesive force or reactivity of the coating material with foreign matter introduced into the folding area 103 may be lower than or equal to a specified level. The coating material may be a material that forms a protective film on the surface of the adhesive layer 200. For example, the coating material may be a fluoride resin (poly tetra fluoro ethylene (PTFE)) such as Teflon™. When the adhesive layer 200 is coated with the fluoride resin, a fluorine compound may form a protective film to prevent the foreign matter introduced into the folding area 103 from adhering to the adhesive layer 200. However, without being limited thereto, the coating material may be a material that forms a stabilized layer to prevent the foreign matter introduced into the folding area 103 from reaching the adhesive layer 200. Furthermore, the adhesive force or reactivity of the coating material with the first bracket 410 or the second bracket 420 may be lower than or equal to a specified level. For example, the coating material may be a non-metallic material that does not adhere or react to the metal of which the first bracket 410 or the second bracket 420 is formed.

In an embodiment, the film may be a polymer resin film. The polymer resin film may be a film using a material that is easily polymerized and easily formed to be a thin film and that has low reactivity. For example, the film may be a polyester film. The adhesive force or reactivity of the polyester film with the foreign matter introduced into the folding area 103 may be lower than or equal to a specified level. Furthermore, the adhesive force or reactivity of the polyester film with the first bracket 410 or the second bracket 420 may be lower than or equal to a specified level. Accordingly, even when the film having a specified thickness T is used, the problem in which the foreign matter introduced into the folding area 103, the first bracket 410, or the second bracket 420 adheres to the adhesive layer 200 may be prevented.

In an embodiment, so as to be applied to the adhesion prevention part 300, the polyester film may have a tensile strength and a coefficient of friction that satisfy a specified condition. For example, the tensile strength of the polyester film may range from 26 kg/mm² to 30 kg/mm². In another example, the coefficient of friction of the polyester film may range from 0.4 to 0.6

In an embodiment, the adhesion prevention part 300 may have the specified thickness T. The adhesion prevention part 300 may have a smaller thickness T than the buffer layer 150 and the adhesive layer 200. The adhesion prevention part 300 may have a thickness T of 20 times to 200 times smaller than the buffer layer 150. The adhesion prevention part 300 may have a thickness T of 4 times to 30 times smaller than the adhesive layer 200. For example, the adhesion prevention part 300 may have a thickness T of 1 µm to 5 µm. When the adhesion prevention part 300 has a smaller thickness T than the buffer layer 150 and the adhesive layer 200, the size of a step formed on the folding area 103 by the adhesion prevention part 300 may be minimized. Furthermore, the thickness of the buffer layer 150 may be varied by external pressure, and therefore a portion of the buffer layer 150 that corresponds to the folding area 103 thickened by the adhesion prevention part 300 may be contracted and may become thinner. Accordingly, flexure on the folding area 103 may be prevented from being visible to a user.

In an embodiment, the first bracket 410 and the second bracket 420 may be disposed on at least parts of the one surface of the adhesive layer 200 and at least parts of one surface of the adhesion prevention part 300. For example, the first bracket 410 may be disposed on a portion of the rear surface of the adhesive layer 200 that corresponds to the first area 101 and on a portion of a rear surface of the adhesion prevention part 300, and the second bracket 420 may be disposed on a portion of the rear surface of the adhesive layer 200 that corresponds to the second area 102 and on a portion of the rear surface of the adhesion prevention part 300.

In an embodiment, a step corresponding to the thickness T of the adhesion prevention part 300 may be formed on the rear surface of the adhesive layer 200 and the rear surface of the adhesion prevention part 300, and therefore to compensate for the step, the first bracket 410 and the second bracket 420 may have, on the rear surface of the adhesion prevention part 300, a smaller thickness reduced by the thickness T of the adhesion prevention part 300 than on the rear surface of the adhesive layer 200. The first bracket 410 and the second bracket 420 may be spaced apart from each other in the first direction.

In an embodiment, the first bracket 410 and the second bracket 420 may be replaced with the one or more plates 140 on which the display 100 is mounted. In this case, the plates 140 may have at least one opening in a portion corresponding to the folding area 103. For example, the plates 140 may include first plates and second plates separated from each other on the rear surface of the folding area 103. In this case, the buffer layer 150, the adhesive layer 200, and the adhesion prevention part 300 may be disposed between the display 100 and the plates 140.

Figure 5:
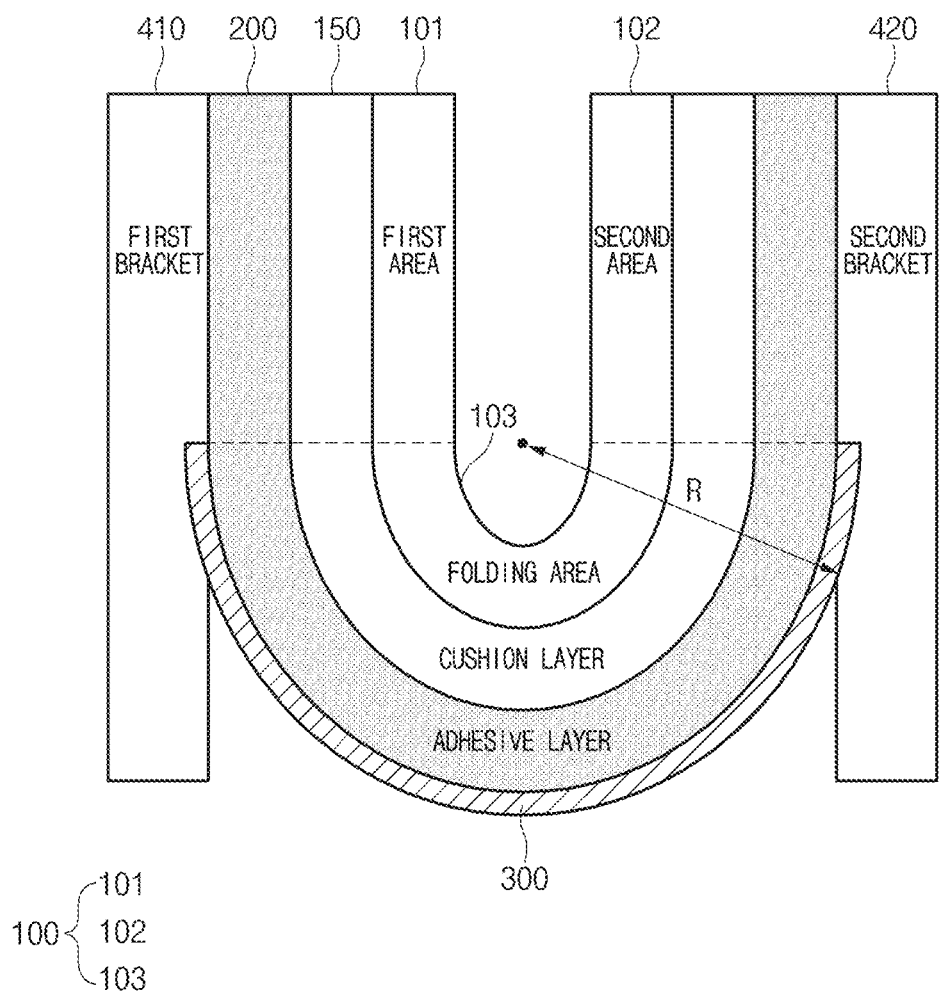
FIG. 5 is a side view illustrating the display, the buffer layer, the adhesive layer, the adhesion prevention part, the first bracket, and the second bracket in a folded state of the foldable electronic device according to an embodiment.

FIG. 5 is a side view illustrating the display 100, the buffer layer 150, the adhesive layer 200, the adhesion prevention part 300, the first bracket 410, and the second bracket 420 in a folded state of the foldable electronic device according to an embodiment.

In an embodiment, the foldable electronic device may be folded in the folding area 103 of the display 100. The foldable electronic device may be folded such that a front surface of the first area 101 of the display 100 and a front surface of the second area 102 thereof face each other. The foldable electronic device may be folded to have a specified curvature R in the folding area 103. The curvature R may be a radius at which the foldable electronic device is folded. More specifically, the curvature R may be defined as a distance from a side surface of the foldable electronic device in the folded state to the center of an arc formed by the rear surface of the adhesion prevention part 300 on the folding area 103. As the curvature R increases, the foldable electronic device may be gently bent in the folding area 103. As the curvature R decreases, the foldable electronic device may be sharply bent in the folding area 103.

In an embodiment, the folding area 103 may be deformed in different forms on the front surface and the rear surface of the display 100. For example, the front surface of the folding area 103 may be contracted, and the rear surface thereof may be bent with the specified curvature R while being expanded.

In an embodiment, on the rear surface of the display 100, the buffer layer 150 may be deformed to correspond to the form of the display 100. On the rear surface of the buffer layer 150, the adhesive layer 200 may be deformed to correspond to the form of the buffer layer 150. For example, the front surfaces of the buffer layer 150 and the adhesive layer 200 may be contracted, and the rear surfaces thereof may be bent with the specified curvature R while being expanded. To allow the buffer layer 150 to be bent with the specified curvature R, the length of the rear surface of the buffer layer 150 may become longer than the length of the front surface of the buffer layer 150. Furthermore, to allow the adhesive layer 200 to be bent with the specified curvature R, the length of the rear surface of the adhesive layer 200 may become longer than the length of the front surface of the adhesive layer 200.

In an embodiment, on the portion of the rear surface of the adhesive layer 200 that corresponds to the folding area 103, the adhesion prevention part 300 may be bent to correspond to the form of the adhesive layer 200. The rear surface of the adhesion prevention part 300 may be further stretched, compared to the front surface of the adhesion prevention part 300.

In an embodiment, the width W of the adhesion prevention part 300 in the first direction may be set depending on the curvature R. The width W of the adhesion prevention part 300 may correspond to the length of the folding area 103 in the first direction. The length of the folding area 103 in the first direction may increase with an increase in the radius at which the foldable electronic device is folded. Accordingly, the width W of the adhesion prevention part 300 may be proportional to the curvature R. For example, the width W of the adhesion prevention part 300 may be about 1.5 times greater than the curvature R. When the curvature R is about 5 mm, the width W of the adhesion prevention part 300 may be about 7.5 mm.

In an embodiment, when the foldable electronic device is folded, at least a portion of the adhesion prevention part 300 may protrude between the first bracket 410 and the second bracket 420. The first bracket 410 and the second bracket 420 may be spaced apart from each other to expose at least part of the rear surface of the adhesion prevention part 300. When the foldable electronic device is folded, at least part of the rear surface of the adhesion prevention part 300 that corresponds to the folding area 103 may be exposed.

In an embodiment, when the first bracket 410 and the second bracket 420 are replaced with the one or more plates 140 on which the display 100 is mounted, at least a portion of the adhesion prevention part 300 may protrude through the at least one opening formed in the portion of each plate that corresponds to the folding area 103. For example, when the plates 140 include the first plates and the second plates separated from each other on the rear surface of the folding area 103, at least a portion of the adhesion prevention part 300 may be exposed between the first plates and the second plates.

In an embodiment, when the foldable electronic device is folded, the adhesion prevention part 300 may remain attached to the one surface of the adhesive layer 200 on the folding area 103. The adhesion prevention part 300 may maintain a state in which the portion corresponding to the folding area 103 covers the adhesive layer 200 when the foldable electronic device is folded. Accordingly, the adhesive layer 200 may not be exposed when the foldable electronic device is folded. The adhesion prevention part 300 may prevent adhesion of foreign matter to the adhesive layer 200 disposed on the portion corresponding to the folding area 103 when the foldable electronic device is folded.

Figure 6:
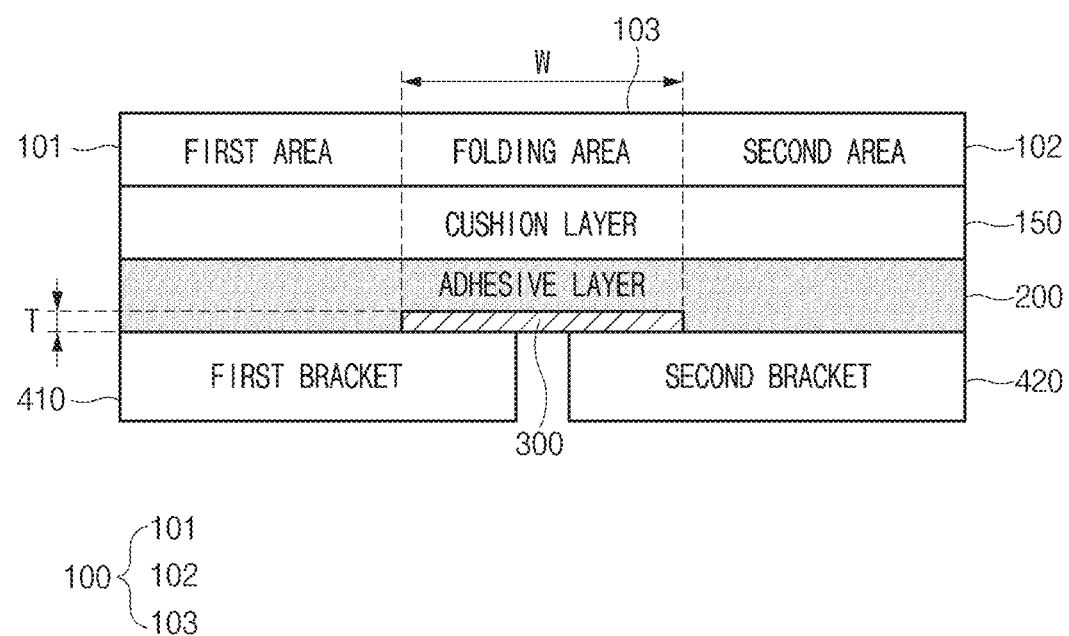
FIG. 6 is a side view illustrating a display, a buffer layer, an adhesive layer, an adhesion prevention part, a first bracket, and a second bracket in a flat state of a foldable electronic device according to an embodiment.
Figure 7:
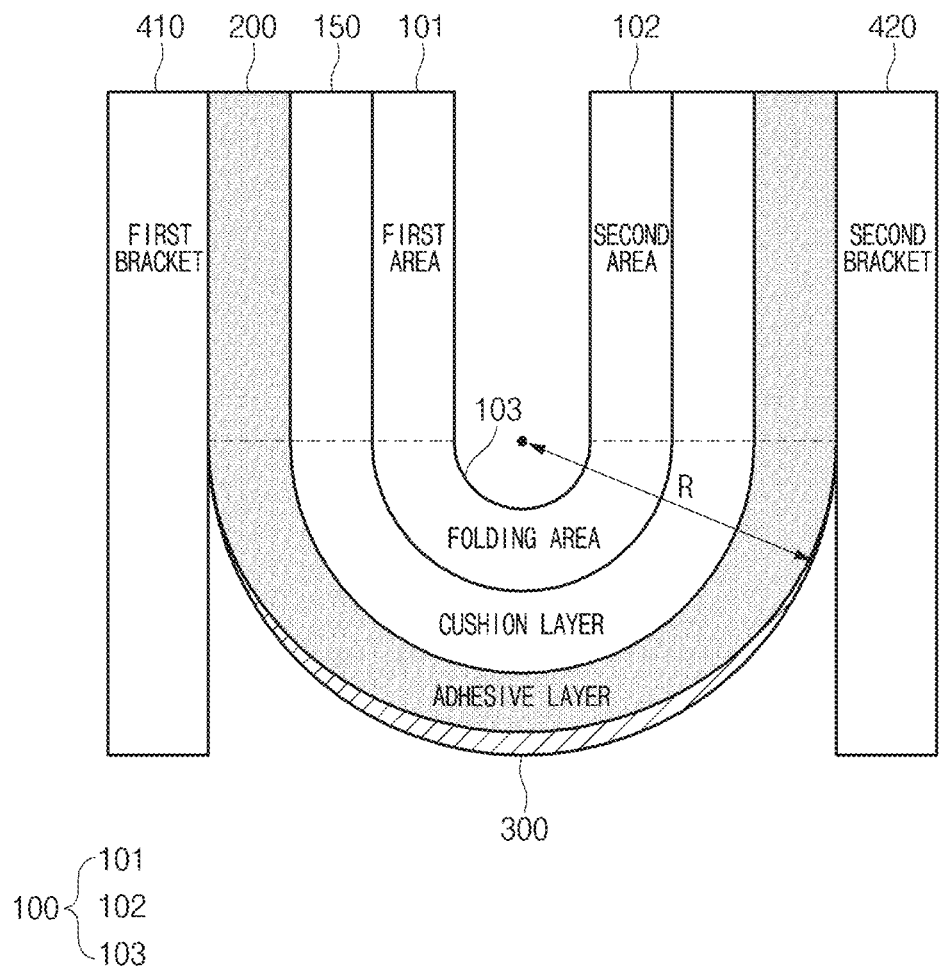
FIG. 7 is a side view illustrating the display, the buffer layer, the adhesive layer, the adhesion prevention part, the first bracket, and the second bracket in a folded state of the foldable electronic device according to an embodiment.

FIG. 6 is a side view illustrating a display 100, a buffer layer 150, an adhesive layer 200, an adhesion prevention part 300, a first bracket 410, and a second bracket 420 in a flat state of a foldable electronic device according to an embodiment. FIG. 7 is a side view illustrating the display 100, the buffer layer 150, the adhesive layer 200, the adhesion prevention part 300, the first bracket 410, and the second bracket 420 in a folded state of the foldable electronic device according to an embodiment. Among descriptions of the components of FIGS. 6 and 7, descriptions identical to the contents described above with reference to FIGS. 4 and 5 will be omitted.

In an embodiment, the adhesion prevention part 300 may have a specified thickness T and may be disposed on a portion of one surface of the adhesive layer 200 that corresponds to a folding area 103 where the foldable electronic device is folded. The adhesion prevention part 300 may be disposed on a rear surface of the adhesive layer 200 disposed on a rear surface of the folding area 103. When the adhesive layer 200 is disposed to have a uniform thickness over the entire rear surface of the buffer layer 150, the thickness of a portion of the foldable electronic device that corresponds to the folding area 103 may be increased by the thickness T of the adhesion prevention part 300. Accordingly, a user may feel a sense of flexure in the folding area 103 due to a step of the folding area 103.

In an embodiment, on the folding area 103, the adhesive layer 200 may have a smaller thickness reduced by the specified thickness T than on areas other than the folding area 103. For example, the adhesive layer 200 may have, on the rear surface thereof, a recess that has the same thickness T as the adhesion prevention part 300 and into which the adhesion prevention part 300 is inserted. When the thickness of the adhesive layer 200 on the folding area 103 is reduced by the thickness T of the adhesion prevention part 300, the foldable electronic device may have the same thickness in a first area 101, a second area 102, and the folding area 103. Accordingly, it is possible to completely solve the problem in which the sense of flexure depending on the step is felt in the folding area.

In an embodiment, the first bracket 410 and the second bracket 420 may cover at least parts of the rear surface of the adhesive layer 200 and at least parts of the rear surface of the adhesion prevention part 300. Because there is no step between the rear surface of the adhesive layer 200 and the rear surface of the adhesion prevention part 300, the first bracket 410 and the second bracket 420 may have the same thickness on the adhesive layer 200 and the adhesion prevention part 300.

In an embodiment, the adhesion prevention part 300 may cover an area disposed on the portion of the rear surface of the adhesive layer 200 that corresponds to the folding area 103. The adhesion prevention part 300 may remain attached to the rear surface of the adhesive layer 200 in the flat state and the folded state of the foldable electronic device. Accordingly, the adhesion prevention part 300 may protect the adhesive layer 200 disposed on the portion corresponding to the folding area 103.

In an embodiment, when the foldable electronic device is folded, the adhesion prevention part 300 may be stretched in the recess formed on the rear surface of the adhesive layer 200 and may not expose the adhesive layer 200. When the foldable electronic device is folded, the length of the rear surface of the adhesion prevention part 300 may be increased such that the adhesive layer 200 is not exposed. Furthermore, the adhesion prevention part 300 may have elasticity satisfying a specified condition such that wrinkles are not generated when the foldable electronic device is unfolded again after folded.

In an embodiment, the length by which the rear surface of the adhesion prevention part 300 is increased may be set depending on the width W of the adhesion prevention part 300 or the specified curvature R that is a radius at which the foldable electronic device is folded. For example, as the width W of the adhesion prevention part 300 is increased, the length by which the rear surface of the adhesion prevention part 300 is increased may also be increased in proportion to the width W of the adhesion prevention part 300. In another example, as the curvature R is increased, the length by which the rear surface of the adhesion prevention part 300 is increased may also be increased in proportion to the curvature R.

In an embodiment, the elasticity of the adhesion prevention part 300 may be set depending on the length by which the rear surface of the adhesion prevention part 300 is increased and the elastic modulus of the material of which the adhesion prevention part 300 is formed. For example, with an increase in the length by which the rear surface of the adhesion prevention part 300 is increased, the elasticity of the adhesion prevention part 300 may also be increased in proportion to the length. In another example, with an increase in the elastic modulus of the material of which the adhesion prevention part 300 is formed, the elasticity of the adhesion prevention part 300 may also be increased in proportion to the elastic modulus.

A foldable electronic device according to various embodiments may include a display 100, a buffer layer 150 disposed on one surface of the display 100, an adhesive layer 200 disposed on one surface of the buffer layer 150, and an adhesion prevention part 300 disposed on a portion of one surface of the adhesive layer 200 that corresponds to a folding area 103 where the foldable electronic device is folded. The adhesion prevention part 300 may be formed by printing an ink material and thereafter curing the ink material with UV light.

In an embodiment, an adhesive force or reactivity of the ink material with foreign matter introduced into the folding area 103 may be lower than or equal to a specified level.

In an embodiment, the ink material may include a monomer or oligomer that constitutes a polymer compound.

In an embodiment, the adhesion prevention part 300 may have a gradually increasing thickness from a periphery of the folding area 103 toward the center of the folding area 103 with respect to a first direction.

In an embodiment, the adhesion prevention part 300 may have a thickness of 1 μm to 5 μm.

In an embodiment, a width of the adhesion prevention part 300 in a first direction may be set depending on a curvature R that is a radius at which the foldable electronic device is folded.

In an embodiment, the foldable electronic device may further include one or more brackets 410 and 420 or one or more plates 140 disposed on at least parts of the one surface of the adhesive layer 200 and at least parts of one surface of the adhesion prevention part 300, and at least a portion of the adhesion prevention part 300 may protrude between the one or more brackets 410 and 420 or through openings of the one or more plates 140 when the foldable electronic device is folded.

In an embodiment, the adhesion prevention part 300 may remain attached to the one surface of the adhesive layer 200 on the folding area 103 when the foldable electronic device is folded.

A foldable electronic device according to various embodiments may include a display 100, a buffer layer 150 disposed on one surface of the display 100, an adhesive layer 200 disposed on one surface of the buffer layer 150, and an adhesion prevention part 300 disposed on a portion of one surface of the adhesive layer 200 that corresponds to a folding area 103 where the foldable electronic device is folded. The adhesion prevention part 300 may be formed by applying a coating material or attaching a film.

In an embodiment, an adhesive force or reactivity of the coating material with foreign matter introduced into the folding area 103 may be lower than or equal to a specified level.

In an embodiment, the film may be a polymer resin film.

A foldable electronic device according to various embodiments may include a display 100, a buffer layer 150 disposed on one surface of the display 100, an adhesive layer 200 disposed on one surface of the buffer layer 150, and an adhesion prevention part 300 that has a specified thickness T and that is disposed on a portion of one surface of the adhesive layer 200 that corresponds to a folding area 103 where the foldable electronic device is folded. The adhesive layer 200 may have, on the folding area 103, a smaller thickness reduced by the specified thickness T than on an area other than the folding area 103.

Figure 8:
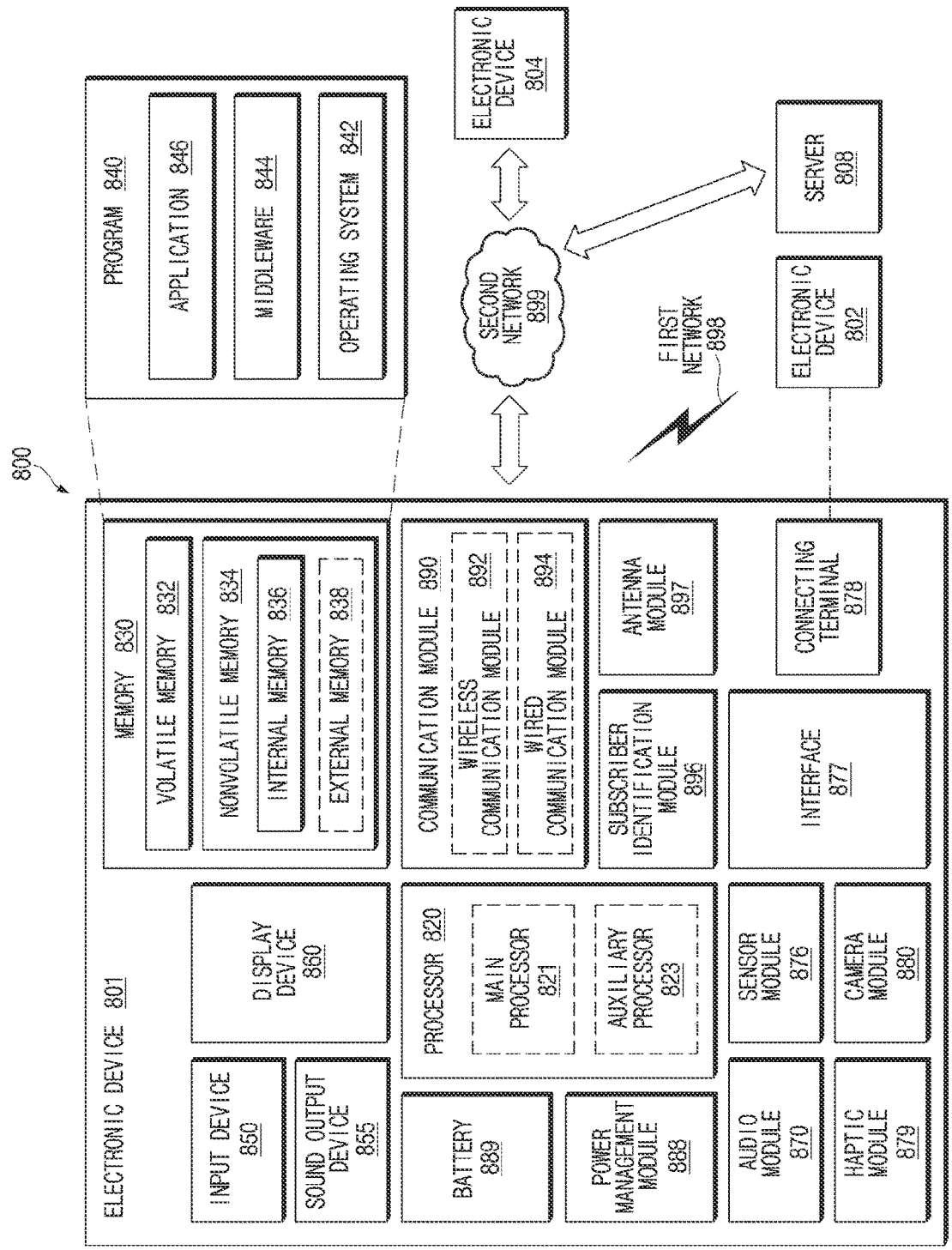
FIG. 8 is a block diagram illustrating an electronic device in a network environment according to various embodiments.

FIG. 8 is a block diagram illustrating an electronic device 801 in a network environment 800 according to various embodiments. Referring to FIG. 8, the electronic device 801 in the network environment 800 may communicate with an electronic device 802 via a first network 898 (e.g., a short-range wireless communication network), or an electronic device 804 or a server 808 via a second network 899 (e.g., a long-range wireless communication network). According to an embodiment, the electronic device 801 may communicate with the electronic device 804 via the server 808. According to an embodiment, the electronic device 801 may include a processor 820, memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) 896, or an antenna module 897. In some embodiments, at least one (e.g., the display device 860 or the camera module 880) of the components may be omitted from the electronic device 801, or one or more other components may be added in the electronic device 801. In some embodiments, some of the components may be implemented as single integrated circuitry. For example, the sensor module 876 (e.g., a fingerprint sensor, an iris sensor, or an illuminance sensor) may be implemented as embedded in the display device 860 (e.g., a display).

The processor 820 may execute, for example, software (e.g., a program 840) to control at least one other component (e.g., a hardware or software component) of the electronic device 801 coupled with the processor 820, and may perform various data processing or computation. According to one embodiment, as at least part of the data processing or computation, the processor 820 may load a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a main processor 821 (e.g., a central processing unit (CPU) or an application processor (AP)), and an auxiliary processor 823 (e.g., a graphics processing unit (GPU), an image signal processor (ISP), a sensor hub processor, or a communication processor (CP)) that is operable independently from, or in conjunction with, the main processor 821. Additionally or alternatively, the auxiliary processor 823 may be adapted to consume less power than the main processor 821, or to be specific to a specified function. The auxiliary processor 823 may be implemented as separate from, or as part of the main processor 821.

The auxiliary processor 823 may control at least some of functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to an embodiment, the auxiliary processor 823 (e.g., an image signal processor or a communication processor) may be implemented as part of another component (e.g., the camera module 880 or the communication module 890) functionally related to the auxiliary processor 823.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input device 850 may receive a command or data to be used by other component (e.g., the processor 820) of the electronic device 801, from the outside (e.g., a user) of the electronic device 801. The input device 850 may include, for example, a microphone, a mouse, a keyboard, or a digital pen (e.g., a stylus pen).

The sound output device 855 may output sound signals to the outside of the electronic device 801. The sound output device 855 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. According to an embodiment, the display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. According to an embodiment, the audio module 870 may obtain the sound via the input device 850, or output the sound via the sound output device 855 or a headphone of an external electronic device (e.g., an electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wiredly) or wirelessly. According to an embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device (e.g., the electronic device 802). According to an embodiment, the connecting terminal 878 may include, for example, a HDMI connector, a USB connector, a SD card connector, or an audio connector (e.g., a headphone connector).

The haptic module 879 may convert an electrical signal into a mechanical stimulus (e.g., a vibration or a movement) or electrical stimulus which may be recognized by a user via his tactile sensation or kinesthetic sensation. According to an embodiment, the haptic module 879 may include, for example, a motor, a piezoelectric element, or an electric stimulator.

The camera module 880 may capture a still image or moving images. According to an embodiment, the camera module 880 may include one or more lenses, image sensors, image signal processors, or flashes.

The power management module 888 may manage power supplied to the electronic device 801. According to one embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the application processor (AP)) and supports a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or infrared data association (IrDA)) or the second network 899 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 801 in a communication network, such as the first network 898 or the second network 899, using subscriber information (e.g., international mobile subscriber identity (IMST)) stored in the subscriber identification module 896.

The antenna module 897 may transmit or receive a signal or power to or from the outside (e.g., the external electronic device) of the electronic device 801. According to an embodiment, the antenna module 897 may include an antenna including a radiating element composed of a conductive material or a conductive pattern formed in or on a substrate (e.g., PCB). According to an embodiment, the antenna module 897 may include a plurality of antennas. In such a case, at least one antenna appropriate for a communication scheme used in the communication network, such as the first network 898 or the second network 899, may be selected, for example, by the communication module 890 (e.g., the wireless communication module 892) from the plurality of antennas. The signal or the power may then be transmitted or received between the communication module 890 and the external electronic device via the selected at least one antenna. According to an embodiment, another component (e.g., a radio frequency integrated circuit (RFIC)) other than the radiating element may be additionally formed as part of the antenna module 897.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 801 and the external electronic device 804 via the server 808 coupled with the second network 899. Each of the electronic devices 802 and 804 may be a device of a same type as, or a different type, from the electronic device 801. According to an embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

Figure 9:
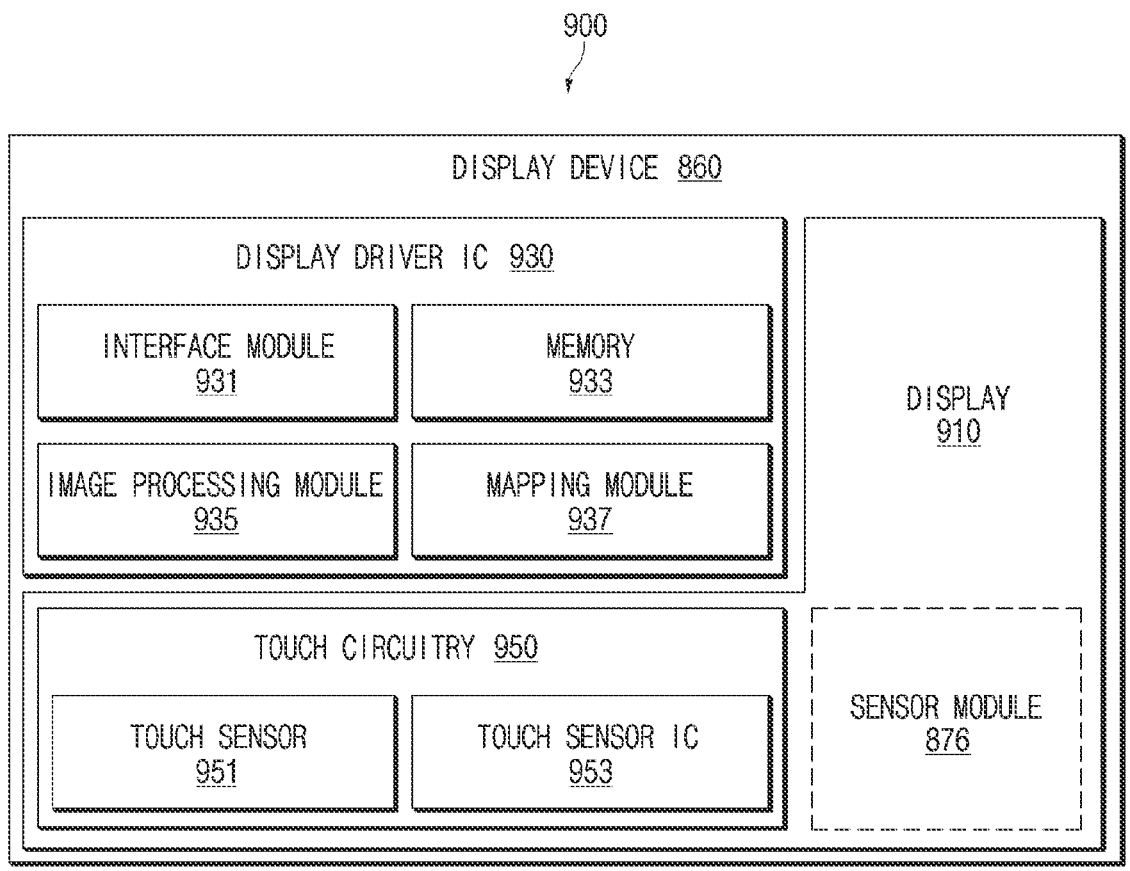
FIG. 9 is a block diagram illustrating the display device according to various embodiments.

FIG. 9 is a block diagram 900 illustrating the display device 860 according to various embodiments. Referring to FIG. 9, the display device 860 may include a display 910 and a display driver integrated circuit (DDI) 930 to control the display 910. The DDI 930 may include an interface module 931, memory 933 (e.g., buffer memory), an image processing module 935, or a mapping module 937. The DDI 930 may receive image information that contains image data or an image control signal corresponding to a command to control the image data from another component of the electronic device 801 via the interface module 931. For example, according to an embodiment, the image information may be received from the processor 820 (e.g., the main processor 821 (e.g., an application processor)) or the auxiliary processor 823 (e.g., a graphics processing unit) operated independently from the function of the main processor 821. The DDI 930 may communicate, for example, with touch circuitry 850 or the sensor module 876 via the interface module 931. The DDI 930 may also store at least part of the received image information in the memory 933, for example, on a frame by frame basis. The image processing module 935 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 910. The mapping module 937 may generate a voltage value or a current value corresponding to the image data pre-processed or post-processed by the image processing module 935. According to an embodiment, the generating of the voltage value or current value may be performed, for example, based at least in part on one or more attributes of the pixels (e.g., an array, such as an RGB stripe or a pentile structure, of the pixels, or the size of each sub-pixel). At least some pixels of the display 910 may be driven, for example, based at least in part on the voltage value or the current value such that visual information (e.g., a text, an image, or an icon) corresponding to the image data may be displayed via the display 910.

According to an embodiment, the display device 860 may further include the touch circuitry 950. The touch circuitry 950 may include a touch sensor 951 and a touch sensor IC 953 to control the touch sensor 951. The touch sensor IC 953 may control the touch sensor 951 to sense a touch input or a hovering input with respect to a certain position on the display 910. To achieve this, for example, the touch sensor 951 may detect (e.g., measure) a change in a signal (e.g., a voltage, a quantity of light, a resistance, or a quantity of one or more electric charges) corresponding to the certain position on the display 910. The touch circuitry 950 may provide input information (e.g., a position, an area, a pressure, or a time) indicative of the touch input or the hovering input detected via the touch sensor 951 to the processor 820. According to an embodiment, at least part (e.g., the touch sensor IC 953) of the touch circuitry 950 may be formed as part of the display 910 or the DDI 930, or as part of another component (e.g., the auxiliary processor 823) disposed outside the display device 860.

According to an embodiment, the display device 860 may further include at least one sensor (e.g., a fingerprint sensor, an iris sensor, a pressure sensor, or an illuminance sensor) of the sensor module 876 or a control circuit for the at least one sensor. In such a case, the at least one sensor or the control circuit for the at least one sensor may be embedded in one portion of a component (e.g., the display 910, the DDI 930, or the touch circuitry 850)) of the display device 860. For example, when the sensor module 876 embedded in the display device 860 includes a biometric sensor (e.g., a fingerprint sensor), the biometric sensor may obtain biometric information (e.g., a fingerprint image) corresponding to a touch input received via a portion of the display 910. As another example, when the sensor module 876 embedded in the display device 860 includes a pressure sensor, the pressure sensor may obtain pressure information corresponding to a touch input received via a partial or whole area of the display 910. According to an embodiment, the touch sensor 951 or the sensor module 876 may be disposed between pixels in a pixel layer of the display 910, or over or under the pixel layer.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. A foldable electronic device comprising:
a display;
a buffer layer disposed on one surface of the display;
an adhesive layer disposed on one surface of the buffer layer;
an adhesion prevention part disposed on a portion of one surface of the adhesive layer corresponding to a folding area where the foldable electronic device is folded; and
a first bracket and a second bracket disposed on at least parts of the one surface of the adhesive layer and at least parts of one surface of the adhesion prevention part,
wherein a width W of the adhesion prevention part is 1.5 times greater than a curvature R, wherein the curvature R is a radius at which the foldable electronic device is folded, and
wherein at least a portion of the adhesion prevention part protrudes between the first bracket and the second bracket when the foldable electronic device is folded.

2. The foldable electronic device of claim 1, wherein an adhesive force or reactivity of an ink material with foreign matter introduced into the folding area is lower than or equal to a specified level.

3. The foldable electronic device of claim 1, wherein an ink material includes a monomer or oligomer configured to constitute a polymer compound.

4. The foldable electronic device of claim 1, wherein the adhesion prevention part has a gradually increasing thickness from a periphery of the folding area toward the center of the folding area with respect to a first direction.

5. The foldable electronic device of claim 1, wherein the adhesion prevention part has a thickness of 1 µm to 5 µm.

6. The foldable electronic device of claim 1, wherein the width of the adhesion prevention part in a first direction is set depending on a curvature that is a radius at which the foldable electronic device is folded.

7. The foldable electronic device of claim 1, wherein the adhesion prevention part is formed by printing an ink material and thereafter curing the ink material with ultraviolet (UV) light.

8. The foldable electronic device of claim 1, wherein the adhesion prevention part remains attached to the one surface of the adhesive layer on the folding area when the foldable electronic device is folded.

9. A foldable electronic device comprising:
a display;
a buffer layer disposed on one surface of the display;
an adhesive layer disposed on one surface of the buffer layer;
an adhesion prevention part disposed on a portion of one surface of the adhesive layer corresponding to a folding area where the foldable electronic device is folded; and
a first bracket and a second bracket disposed on at least parts of the one surface of the adhesive layer and at least parts of one surface of the adhesion prevention part,
wherein a width W of the adhesion prevention part is 1.5 times greater than a curvature R, wherein the curvature R is a radius at which the foldable electronic device is folded, wherein at least a portion of the adhesion prevention part protrudes between the first bracket and the second bracket when the foldable electronic device is folded, and wherein the adhesion prevention part is formed by applying a coating material or attaching a film.

10. The foldable electronic device of claim 9, wherein an adhesive force or reactivity of the coating material with foreign matter introduced into the folding area is lower than or equal to a specified level.

11. The foldable electronic device of claim 9, wherein the film is a polymer resin film.

12. The foldable electronic device of claim 9, wherein the adhesion prevention part has a thickness of 1 μm to 5 μm.

13. The foldable electronic device of claim 9, wherein the width of the adhesion prevention part in a first direction is set depending on a curvature that is a radius at which the foldable electronic device is folded.

14. The foldable electronic device of claim 9, wherein the adhesion prevention part remains attached to the one surface of the adhesive layer on the folding area when the foldable electronic device is folded.

\* \* \* \* \*